(12) United States Patent
Savage

(10) Patent No.: US 6,832,769 B2
(45) Date of Patent: Dec. 21, 2004

(54) DOLLY FOR A SNOWMOBILE

(76) Inventor: Glenn R. Savage, Box 286, Oswego, IL (US) 60543

( * ) Notice: Subject to any disclaimer, the term of this patent is extended or adjusted under 35 U.S.C. 154(b) by 142 days.

(21) Appl. No.: 10/217,753

(22) Filed: Aug. 13, 2002

(65) Prior Publication Data
US 2004/0032104 A1 Feb. 19, 2004

(51) Int. Cl.⁷ .................................................. B52B 1/00
(52) U.S. Cl. .................................................... 280/79.11
(58) Field of Search ............................ 280/79.11, 79.2, 280/79.3, 79.4, 79.5, 79.6, 79.7; D34/23

(56) References Cited

U.S. PATENT DOCUMENTS

| 3,424,474 A | * | 1/1969 | Karnow et al. ............ 280/79.2 |
| 3,527,470 A | * | 9/1970 | Ord ........................... 280/79.2 |
| 3,658,200 A | * | 4/1972 | Chaplinski .................. 414/447 |
| 3,881,740 A | * | 5/1975 | Johnson et al. ........... 280/79.11 |
| 3,897,959 A | * | 8/1975 | Haffner ..................... 280/79.11 |
| 4,288,087 A | | 9/1981 | Morrison |
| D310,904 S | * | 9/1990 | Dinges ......................... D34/12 |
| 5,161,932 A | | 11/1992 | Johnson |
| 5,441,378 A | | 8/1995 | Puls |
| 5,449,184 A | * | 9/1995 | Knobloch ................. 280/79.11 |
| 5,632,498 A | | 5/1997 | Beaudet et al. |
| 5,716,061 A | | 2/1998 | Sloan et al. |
| 5,727,920 A | | 3/1998 | Hull et al. |
| 6,206,386 B1 | * | 3/2001 | Briggs ...................... 280/79.11 |
| 6,244,603 B1 | | 6/2001 | Rizzardi |
| 6,283,698 B1 | * | 9/2001 | Lee ............................. 414/537 |
| 2001/0033071 A1 | * | 10/2001 | Krumwiede ................ 280/656 |
| 2003/0173752 A1 | * | 9/2003 | Veeser .......................... 280/35 |

* cited by examiner

Primary Examiner—Bryan Fischmann
(74) Attorney, Agent, or Firm—Mathew R. P. Perrone, Jr.

(57) ABSTRACT

A dolly for a snowmobile has ski ramp to receive each ski of the snowmobile and support each ski, while having a belt ramp to both receive the belt drive or driving belt of the snowmobile, and permit the snowmobile to be lifted onto the dolly or lowered off of the dolly. The dolly has lockable castors to assist loading or unloading of the snowmobile.

11 Claims, 5 Drawing Sheets

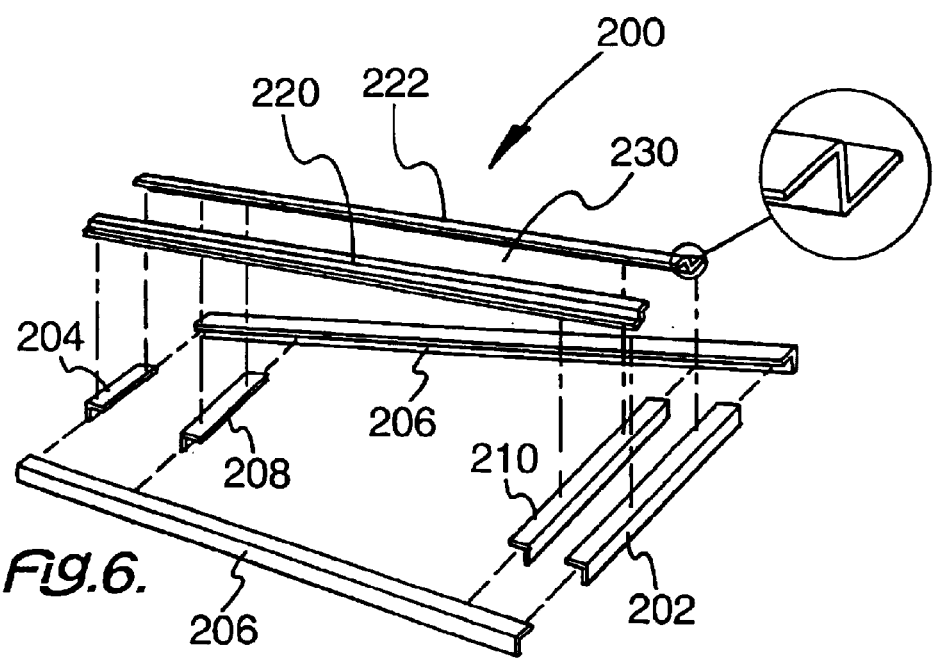
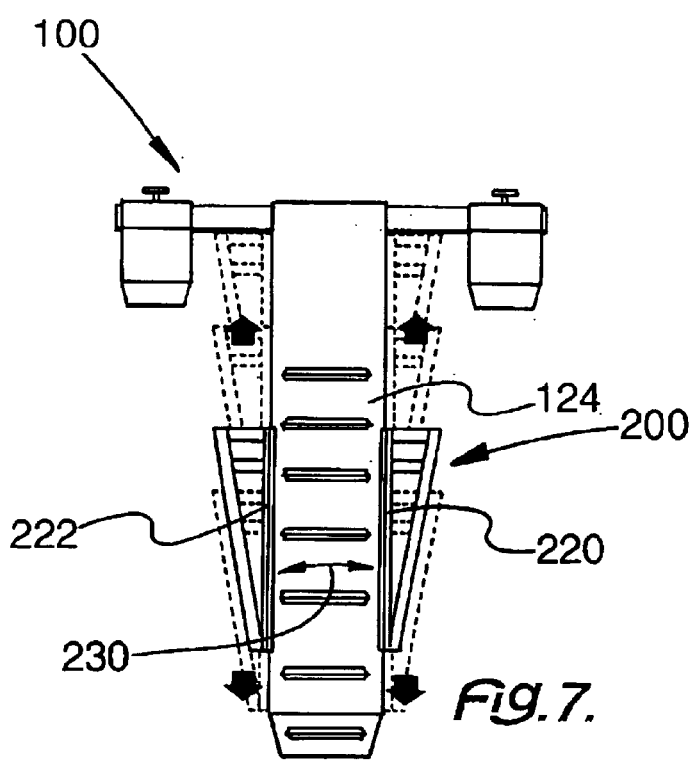
Fig.6.
Fig.7.

DOLLY FOR A SNOWMOBILE

This invention relates to a dolly for a snowmobile, and more particularly to a dolly for a snowmobile providing for driving a snowmobile onto the dolly.

BACKGROUND OF THE INVENTION

While a snowmobile has many uses, it is difficult to maneuver when not running. It is not always convenient to maneuver the snowmobile under its own power. Furthermore, due to the weight of the snowmobile, moving the same without power is difficult.

In order to move the snowmobile, while its engine is not running, a number of wheeled devices commonly known as dollies are available. Basically, a dolly includes a platform mounted on a set of casters. With the snowmobile mounted on the dolly, the dolly permits the snowmobile to be moved easily.

The problem with the snowmobile dollies of the prior art is that it is difficult to get the snowmobile thereon. The weight of the snowmobile requires raising the snowmobile with at least one jack and placing a dolly thereunder. Such a raising step greatly complicates the use of the dolly.

SUMMARY OF THE INVENTION

Among the many objectives of this invention is the provision of a wheel-mounted dolly for a snowmobile, which permits the snowmobile to be driven thereon.

A further objective of this invention is the provision of a dolly for a snowmobile capable of supporting both the skis and the track.

Yet a further objective of this invention is the provision of a dolly for a snowmobile having a pair of ski receivers to assist the mounting of the snowmobile thereon.

A still further objective of this invention is the provision of a dolly for a snowmobile to cooperate with a track of a snowmobile.

Another objective of this invention is the provision of a dolly for a snowmobile capable of releasing both the skis and the track therefrom.

Yet another objective of this invention is the provision of a snowmobile to avoid lifting of the device.

Still, another objective of this invention is the provision of a wheel-mounted dolly for a snowmobile having a pair of ski receivers to assist the receiving of the snowmobile thereon.

These and other objectives of the invention (which other objectives become clear by consideration of the specification, claims and drawings as a whole) are met by providing a dolly for a snowmobile, having a ski ramp to receive each ski and support the same, while having a belt ramp to both receive the belt drive or driving belt of the snowmobile, and permit the weight of the snowmobile to the lift the snowmobile onto the dolly or off of the dolly.

BRIEF DESCRIPTION OF THE DRAWINGS

FIG. 6 depicts a top, exploded, perspective view of an adjustable trapezoidal frame assembly 200 for the snowmobile dolly 100 of this invention.

FIG. 7 depicts a top, exploded, perspective view for the adjustable trapezoidal frame assembly 200 for the snowmobile dolly 100 of this invention.

Throughout the figures of the drawings, where the same part appears in more than one figure of the drawings, the same number is applied thereto.

DESCRIPTION OF THE PREFERRED EMBODIMENTS

Figure 1:
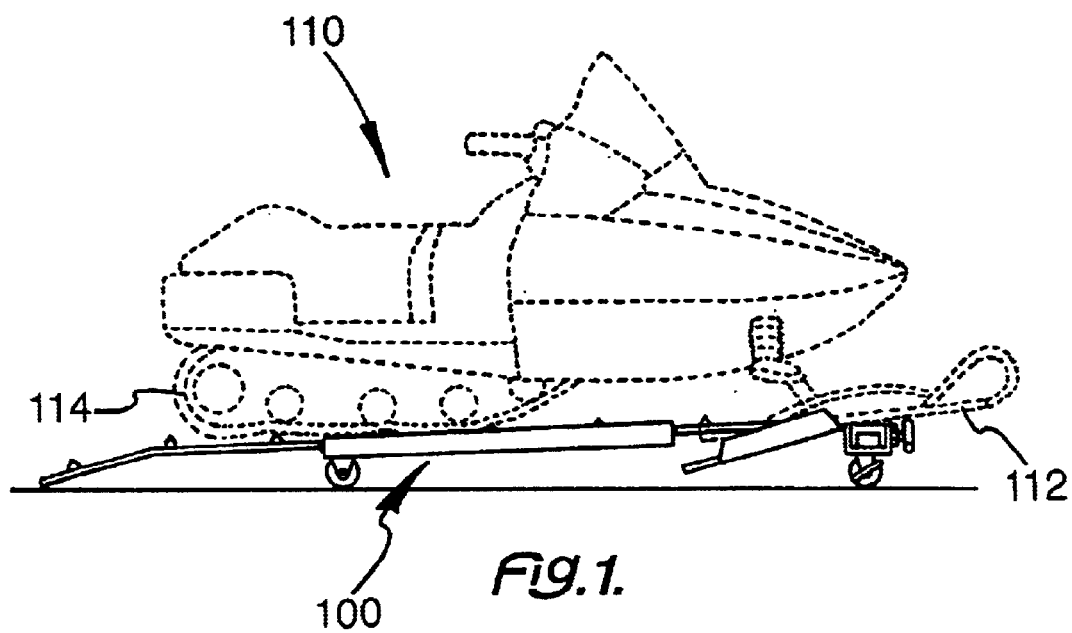
FIG. 1 depicts a perspective view of a snowmobile dolly 100 of this invention having a snowmobile 110 shown thereon in phantom.

The snowmobile dolly has a generally T-shaped structure from a top perspective view. The cross member of the T-shaped structure is designed to support each ski of a snowmobile. The base member of the T-shaped structure is designed to support the driving track of the snowmobile. At each end of the cross member is a ski pickup or ramp assembly. Mounted on the base member is the track support to receive the driving track of the snowmobile.

Preferably, the cross member of the T-shaped structure is formed by the cooperation of a member with a squared C-shaped cross section and two members having hollow rectangular cross-section, which forms the cross member of a T-shaped frame. In order to reinforce the cross member, a C-shaped member is mounted therein. The track support is mounted to the C-shaped member. As such, the rectangular cross-section tubes may slide on the C-shaped member, thereby adjusting the ski pickups to fit a width of the skis.

Secured to each rectangular tube adjacent to each end thereof is the ramp assembly with the ski pickup. The ski pickup is bolted or otherwise secured to the rectangular tube and has a lockable caster assembly therebelow. Bolts, such as T-bolts permit adjusting of the ski pickups.

As the track support is mounted on the cross member, it is bolted or otherwise secured to the C-shaped member. The track support is an elongated, flattened member with various cleats thereon at reasonable intervals to provide a gripping mechanism for driving a snowmobile onto the snowmobile dolly. The cleats provide raised gripping points for the driving of the snowmobile onto the snowmobile dolly. In this manner, track support provides an effective dolly.

Supported below the track support is an adjustable trapezoidal frame. The frame is a generally trapezoidal shape with its base closer to the cross member. Within a generally trapezoidal shape is a barred rectangular shape. The longer bars of the rectangular shape permit attachment of the trapezoidal frame to the track support. Also, the longer bars are permitted to slide on the track support, thereby giving the frame an adjustable position along the track support.

At each corner of the trapezoid, is mounted a caster, which permits the frame to cooperate with the lockable casters on the ski supports. With the cleats on the base member, which is the same as the track support, the track support has freely rotating wheels or lockable casters in order to permit movement of the snowmobile while on the dolly.

The free wheels are casters which are not lockable, and thus lack a mechanism thereon to stop rotation. The lockable casters include a device as a part thereof to prevent rotation. The lockable casters also serve to secure the dolly while the snowmobile is being mounted thereon or removed therefrom. Both types of lockable casters and non-lockable casters are standard devices.

The snowmobile dolly of this invention can be made or formed from many suitable materials. These materials may be metal or plastic so long as they have the required durability to withstand the weight of a snowmobile. Aluminum may well be the best material for the snowmobile dolly because of its light weight and strength. However, steel or high impact plastic may also be used. The casters for the dolly must be capable of rotating both vertically and horizontally at least the 360 degrees. Preferably, the rotation of each caster must exceed a plurality of 360 degrees in its rotational modes.

Figure 2:
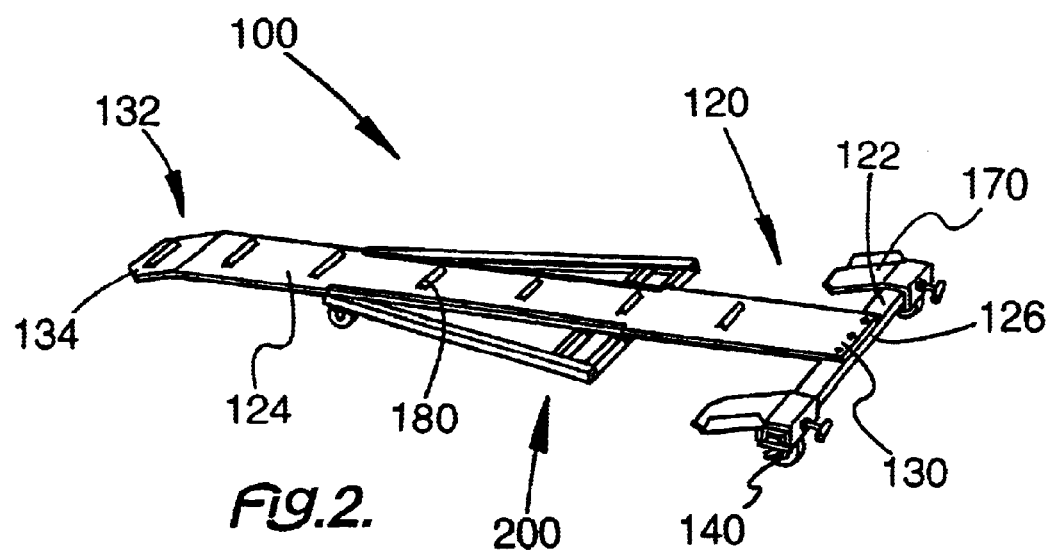
FIG. 2 depicts a front, perspective view of the snowmobile dolly 100 of this invention.
Figure 3:
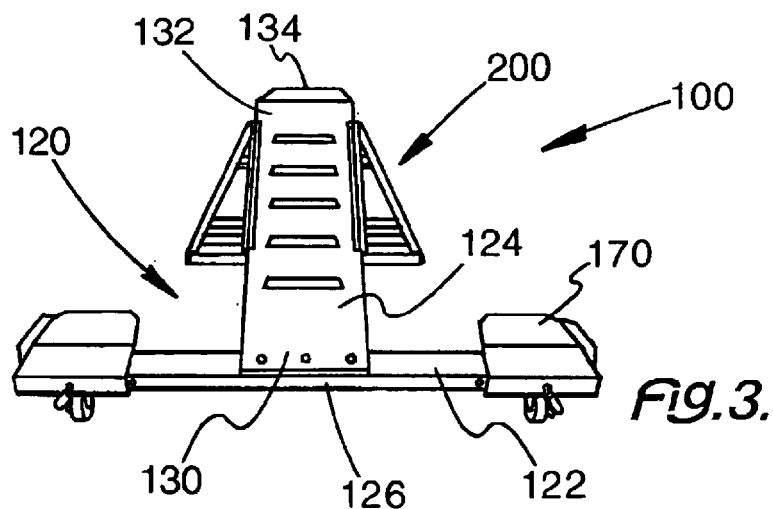
FIG. 3 depicts a top, front, perspective view of the snowmobile dolly 100 of this invention.
Figure 4:
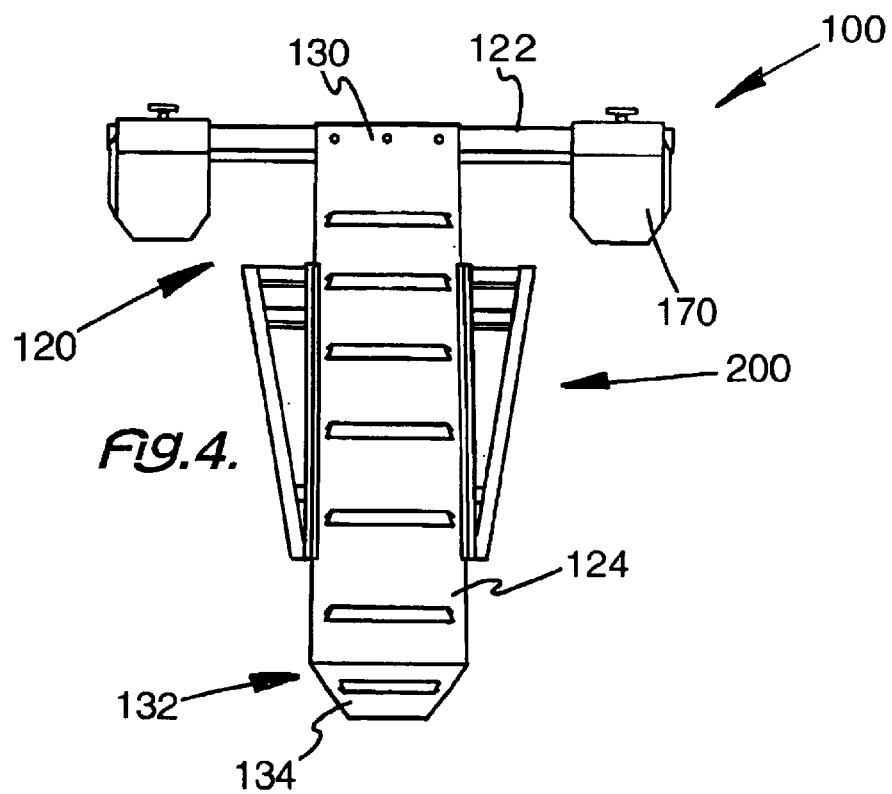
FIG. 4 depicts a top, rear, perspective view of the snowmobile dolly 100 of this invention.

Referring now to FIG. 1, a snowmobile dolly 100 supports a snowmobile 110 thereon. Adding FIG. 2, FIG. 3, and FIG. 4 to the discussion, the supporting features of snowmobile dolly 100 become more clear in relation to snowmobile 110. Snowmobile dolly 100 has a T-shaped member 120 and an adjustable frame assembly 200. The cross member 122 of the T-shaped member 120 supports the skis 112 of snowmobile 110. The base member 124 of the T-shaped member 120 supports the belt assembly or the driving track 114 of snowmobile 110.

More particularly, cross member 122 has a substantially central mounting point 126 for base member 124. The base member 124 is molded, bolted, welded, glued, or otherwise secured to cross member 122 at central mounting point 126.

As base member 124 has a secured end 130 joined to the central mounting point 126, it also has a free end 132 oppositely disposed from secured end 130. Also, at free end 132 is lifting lip 134. Lifting lip 134 provides a ramp to lift or guide driving track 114 onto base member 124. By lifting track 114 onto base member 124, and skis 112 onto pickup ramp 170, snowmobile 110 is positioned on dolly 100.

Between free end 132 and secured end 130, is positioned adjustable frame assembly 200, which provides flexibility for dolly 100 and that may be adapted to a wide variety of snowmobiles including snowmobile 110. The adjustable frame assembly 200 may be releasably secured to base member 124 at any point between free end 132 and secured end 130.

Figure 5:
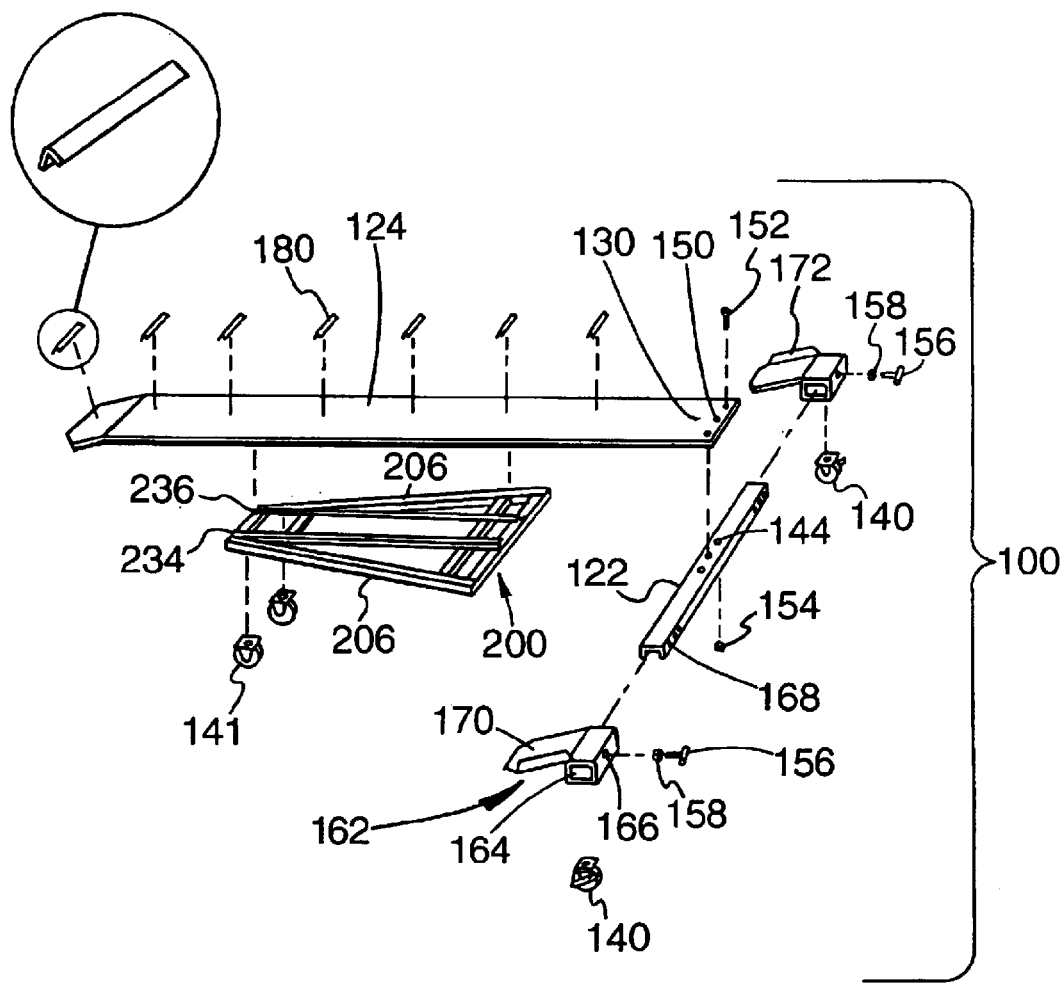
FIG. 5 depicts a top, exploded, perspective view of the snowmobile dolly 100 of this invention.

With the further consideration of FIG. 5, the structure of snowmobile dolly 100 becomes more clear. The cross member 122 basically provides support for the skis 112 of the snowmobile 110. More particularly, cross member 122 has a pair of end mounted lockable casters 140 secured thereto at each end thereof. Each of the end mounted lockable casters 140 may rotate freely at any range, including, but not limited to, 360 degrees or more about either a vertical axis or a horizontal axis.

Lockability of casters 140 may inhibit rotation as desired. With the casters 140 locked, it is easier to drive the snowmobile 110 on or off of the dolly 100.

In a most preferred form, cross member 122 has a squared C-shaped. Bar apertures 144; being centrally located in cross member 122; permit secured end 130 of base member 124 to be secured thereat due to ramp apertures 150 in secured end 130. Bar apertures 144 and ramp apertures 150 may be aligned and receive bolts 152, which bolts 152 may receive corresponding nut 154, thereby securing cross member 122 and base member 124 together.

At each end of cross member 122 a ramp assembly 162 is provided. Ramp assembly 162 includes a ramp tube 164, which is adapted to receive an end of cross member 122. Ramp tube 164 has a tube aperture 166 adapted to align with a cross aperture 168 in the end of cross member 122, thereby permitting cross bolt 156 and cross nut 158 (FIG. 5) to provide a securing device.

Extending from the ramp tube 164 is a pickup ramp 170, which is adapted to receive a ski 112 of the snowmobile 110. Pickup ramp 170 has a raised outer bar 172 to provide guidance for ski 112. Secured to the bottom of tube 164 is a lockable caster 140. With a similar ramp assembly 162 oppositely disposed therefrom on cross member 122 at its opposing end, skis 112 are easily lifted off of the ground and onto T-shaped member 120 under the power of snowmobile 110.

Positioned along base member 124 is a plurality of cleats 180. Each cleat 180 may be bolted, welded, glued or otherwise secured to base member 124. As the snowmobile 110 approaches snowmobile dolly 100, cleats 180 cooperate with the driving track 114 of snowmobile 110.

On base member 124 at an end oppositely disposed from secured end 130 is a lifting lip 134 for the driving track 114 of snowmobile 110. Thus, the driving track 114 may lift itself and the snowmobile 110 onto snowmobile dolly 100.

By providing a plurality of tube apertures 166 adapted to align with a plurality of cross apertures 168, snowmobile dolly 100 in general and pickup ramp 170 in particular may be adjusted to compensate for the width of the snowmobile skis 112. Such an adjustment permits snowmobile dolly 100 to receive a variety of snowmobiles.

Adding FIG. 6 to the consideration, the structure of adjustable frame assembly 200 become clear. The adjustable frame assembly 200 may slide relative to base member 124 in order to permit snowmobile dolly 100 to be used with a variety of snowmobiles.

Adjustable frame assembly 200 may be assembled from tubular members, L-shaped members or any other appropriate shape. L-shaped members appear to provide the most functional adjustable frame assembly 200. Adjustable frame assembly 200 has a generally trapezoidal shape. The trapezoidal shape appears to provide the most efficiency and flexibility.

More particular, the adjustable frame assembly 200 has a front bar 202, preferably L-shaped as shown, and a rear bar 204. Front bar 202 is slightly longer than rear bar 204. A pair of isosceles bars 206 join front bar 202 and rear bar 204 in order to complete an isosceles trapezoid. Buttressing the isosceles trapezoid is a first intermediate base 208 adjacent and parallel to rear bar 204; and second intermediate base 210 adjacent and parallel to front bar 202. The adjustable frame assembly 200 is preferably formed of L-shaped bars as shown.

First support bar 220 and second support bar 222 are mounted or secured to bar 204 and front bar 202 perpendicularly thereto. A space 230 between first support bar 220 and second support bar 222 provides a sufficient width to support base member 124. Front bar 202 is closer to crosspiece 122 than is rear bar 204. At first intersection 234 and second intersection 236 of rear bar 204 with each of isosceles bars 206 is mounted a standard caster 141. Standard caster 141 can also be replaced with a lockable caster 140 such as is positioned by cross member 122.

Figure 8:
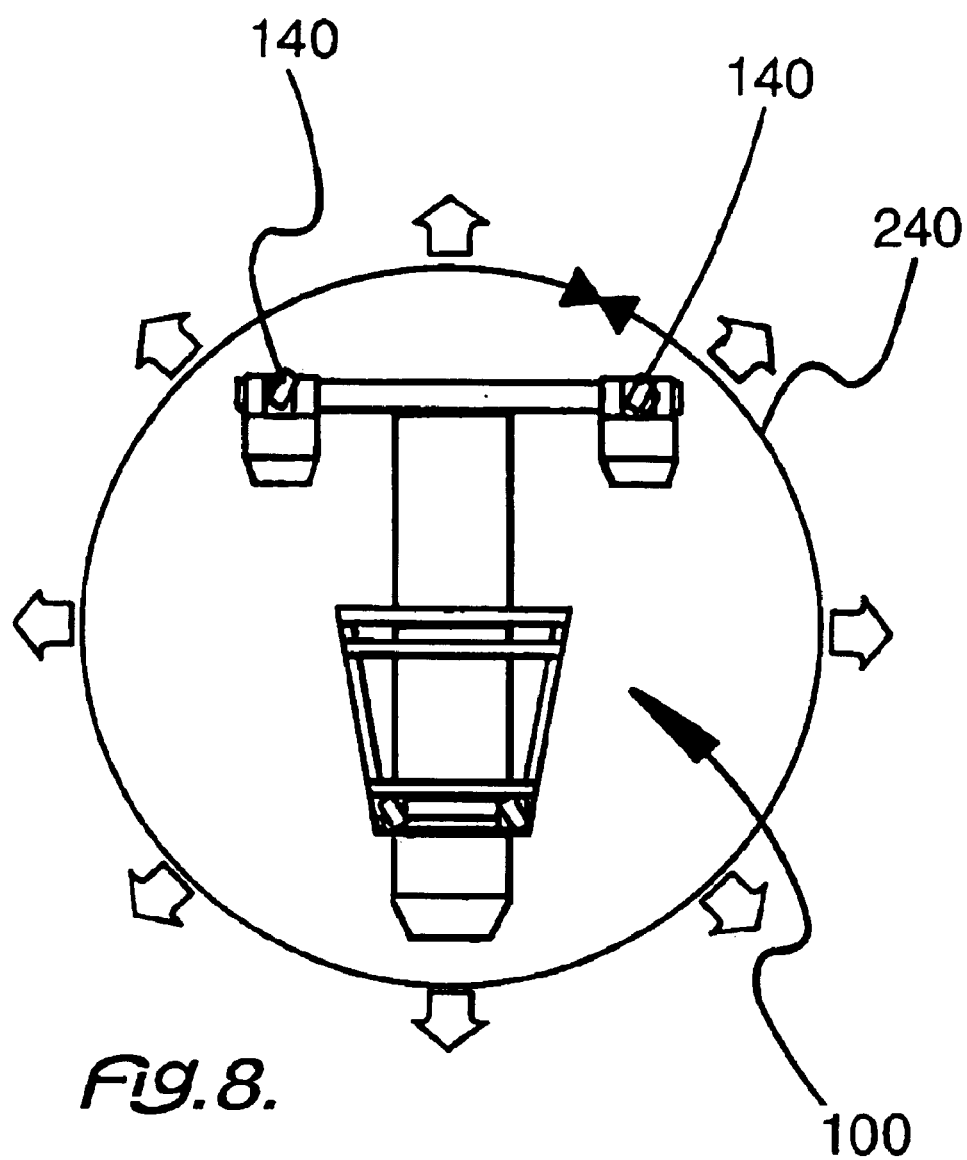
FIG. 8 depicts a bottom, perspective view of the snowmobile dolly 100 of this invention with lockable caster 140.

With consideration of FIG. 7 and FIG. 8, the mobility of snowmobile 110, on dolly 100 becomes clear. Adjustable frame assembly 200 has first support bar 220 and second support bar 222 being spaced appropriately to receive base member 124. Thus, base member 124 rests between first support bar 220 and second support bar 222. Preferably, each of first support bar 220 and second support bar 222 rests on opposing long sides of base member 124. With such a support, the adjustable frame assembly 200 may slide along base member 124 to a desired position. One such a desired position is determined empirically, the snowmobile 110 may determine onto snowmobile dolly 100.

Lockable casters 140 serve to hold the snowmobile dolly 100 in a desired position as the snowmobile 110 is driven thereon. Then the casters 140 may be unlocked, and the snowmobile dolly 100 moved in any desired direction, by hand if desired, including circle 240.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A snowmobile dolly adapted to support a snowmobile comprising:

(a) a T-shaped frame having a cross member and a base member adapted to support the snowmobile;

(b) the T-shaped frame having at least one lockable caster in order to assist driving the snowmobile onto or off of the snowmobile dolly;

(c) the cross member supporting a ski assembly of the snowmobile;

(d) the base member supporting a belt assembly of the snowmobile;

(e) the T-shaped frame including a T-shaped structure formed from the cross member and the base member;

(f) the cross member of the T-shaped structure having a first ski ramp assembly and a second ski ramp assembly adapted to support a first ski and a second ski of the ski assembly;

(g) the first ski ramp assembly being mounted on a first end of the cross member;

(h) the second ski ramp assembly being mounted on a first end of the cross member;

(i) the first end of the cross member being oppositely disposed from the second end of the cross member;

(j) the base member of the T-shaped structure being adapted to support a driving belt of the belt assembly for the snowmobile;

(k) the base member and the cross member cooperating in order to support the snowmobile;

(l) the first ski ramp assembly having a first ski pickup ramp secured thereto;

(m) the second ski ramp assembly having a second ski pickup ramp secured thereto;

(n) the cross member having the base member secured thereto between the first ski ramp assembly and the second ski ramp assembly;

(o) the base member being an elongated member to provide a track support with at least two cleats thereon spaced at intervals to provide a gripping mechanism for the driving belt in order to assist the snowmobile being driven onto the snowmobile dolly;

(p) the base including the track support and an adjustable frame secured below the track support; and (q) the adjustable frame being repositionable along the track support;

(r) the frame having a generally trapezoidal shape;

(s) the generally trapezoidal shape having a front closer to the cross member when mounted on the track support;

(t) a barred rectangular shape being mounted on the frame;

(u) a pair of longer parallel bars for the barred rectangular shape being securable to the track support; and (v) the pair of longer parallel bars permitting adjustment of the frame along the track support.

2. The snowmobile dolly of claim 1 further comprising:

(a) the longer bars being slidable on the track support;

(b) a frame caster being mounted at each corner of the narrow end of the trapezoidal shape;

(c) a first ski caster being mounted adjacent to the first ski ramp assembly; and (d) a second ski caster being mounted adjacent to the second ski ramp assembly.

3. The snowmobile dolly of claim 2 further comprising:

(a) the track support having a free end oppositely disposed from a secured end;

(b) the secured end being joined to the cross member;

(c) the free end having a lifting Lip;

(d) the lifting lip receiving the track and guiding the track onto the base member; and (e) the snowmobile being thus positioned on the dolly.

4. The snowmobile dolly of claim 3 further comprising:

(a) the cross member having a first lockable caster and a second lockable caster at each end thereof;

(b) the first lockable caster and the second lockable caster rotating about a vertical axis and a horizontal axis; and (c) the first lockable caster and the second lockable caster each including a locking means to inhibit rotation thereof as desired.

5. The snowmobile dolly of claim 4 further comprising:

(a) the cross member having a squared C-shaped member;

(b) the cross member having the first ski ramp assembly at a first end of the squared C-shaped member and the second ski ramp assembly at a second end of the squared C-shaped member; and (c) the track support having the secured end mounted at a central portion of the squared C-shaped member.

6. The snowmobile dolly of claim 5 further comprising:

(a) the first ramp assembly and the second ramp assembly being similar in structure;

(b) the first ramp assembly including a first ramp tube and the first ski pickup ramp;

(c) the first ramp tube receiving the first end of the C-shaped member;

(d) the second ramp assembly including a second ramp tube and the second ski pickup ramp;

(e) the second ramp tube receiving the second end of the C-shaped member;

(f) the first ski pickup ramp being adapted to receive the first ski of the snowmobile;

(g) the second ski pickup ramp being adapted to receive the second ski of the snowmobile;

(h) the first ramp tube receiving the first end of the C-shaped member; and (i) the first ski pickup ramp and the second ski pickup ramp cooperating to lift the first ski and the second ski respectively onto the snowmobile dolly as the belt assembly is lifted onto the track support.

7. The snowmobile dolly of claim 6 further comprising:
(a) the first ramp tube and the second ramp tube each having at least one tube aperture;
(b) the C-shaped member having at least one cross aperture for each of at least one tube aperture; and
(c) each of the least one cross aperture being alignable with one of the at least one tube aperture.

8. The snowmobile dolly of claim 7 further comprising:
(a) the first ramp tube having the first lockable caster mounted thereon;
(b) the second ramp tube having the second lockable caster mounted thereon; and
(c) the frame casters being lockable.

9. The snowmobile dolly of claim 8 further comprising:
(a) the at least two cleats being bolted, welded, or glued to the base member;
(b) the free end of the base member including the lifting lip for the track of the snowmobile; and
(c) the at least one tube aperture combining with the at least one cross aperture in order to permit adjustability for the first first ski pickup ramp and the second ski pickup ramp.

10. The snowmobile dolly of claim 9 further comprising:
(a) the adjustable frame assembly being releasably secured to base member in order to provide an adjustment factor in order to render the snowmobile dolly compatible with at least one model of the snowmobile;
(b) the adjustable frame assembly being formed from L-shaped members;
(c) the adjustable frame assembly having a trapezoidal shape;
(d) the adjustable frame assembly having a front bar and a rear bar with the front bar being longer than the rear bar;
(e) a first isosceles bar and a second isosceles bar joining the front bar and the rear bar in order to complete an isosceles trapezoid;
(f) the adjustable frame assembly having a first intermediate base adjacent and parallel to the rear bar and a second intermediate base adjacent and parallel to the front bar;
(g) a first support bar and a second support bar being secured to the rear bar and the front bar perpendicularly thereto; and
(h) the first support bar and the second support bar having a space therebetween of sufficient width to support the base member.

11. A snowmobile dolly adapted to support a snowmobile comprising:
a T-shaped frame having a cross member and a base member adapted to support the snowmobile;
the T-shaped frame having at least one lockable caster in order to assist driving the snowmobile onto or off of the snowmobile dolly;
the cross member supporting a ski assembly of the snowmobile; and
the base member being an elongated flat member adapted to support a belt assembly of the snowmobile,
the T-shaped frame including a T-shaped structure formed from the cross member and the base member;
the cross member of the T-shaped structure having a first ski ramp assembly and a second ski ramp assembly adapted to support a first ski and a second ski of the ski assembly;
the base member of the T-shaped structure being adapted to support a driving belt of the belt assembly for the snowmobile;
the base member and the cross member cooperating in order to support the snowmobile;
the cross member having a first ski ramp assembly and a second ski ramp assembly adapted to support a first ski and a second ski of the ski assembly;
the first ski ramp assembly being mounted on a first end of the cross member;
the second ski ramp assembly being mounted on a second end of the cross member;
the first end of the cross member being oppositely disposed from the second end of the cross member;
the base member of the T-shaped structure being adapted to support a driving belt of the belt assembly for the snowmobile;
the cross member having the base member secured thereto between the first ski ramp assembly and the second ski ramp assembly;
a track support being an elongated member with at least two cleats thereon spaced at intervals to provide a gripping mechanism for the driving belt in order to assist the snowmobile being driven onto the snowmobile dolly;
the base member including the track support and an adjustable frame secured below the track support;
the adjustable frame being repositionable along the track support;
the adjustable frame having a generally trapezoidal shape; and
the generally trapezoidal shape having a front closer to the cross member when mounted on the track support.

* * * * *